Sept. 19, 1950   V. A. TAYLOR   2,522,849
AIRCRAFT EMERGENCY EXIT SYSTEM
Filed May 6, 1948   2 Sheets-Sheet 1
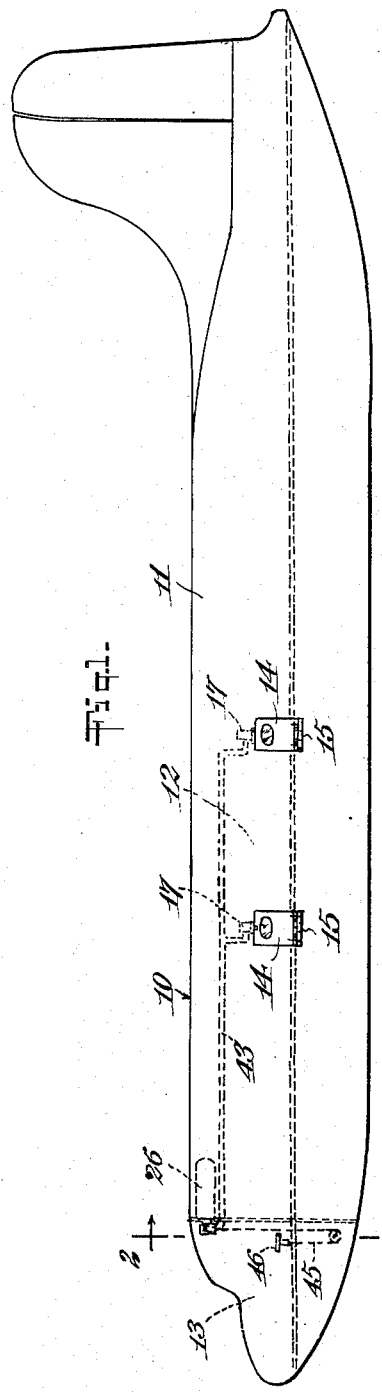
INVENTOR
Vernon A. Taylor
BY
Munn, Liddy & Glaccum
ATTORNEYS Sept. 19, 1950  V. A. TAYLOR  2,522,849
AIRCRAFT EMERGENCY EXIT SYSTEM
Filed May 6, 1948  2 Sheets-Sheet 2
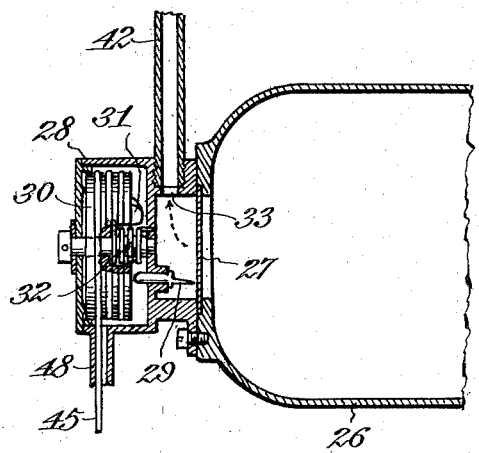
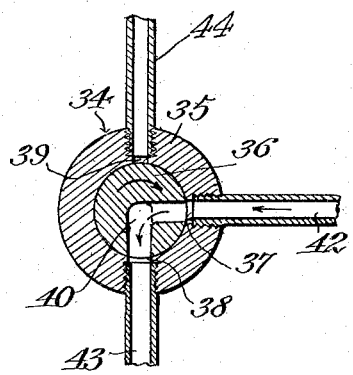
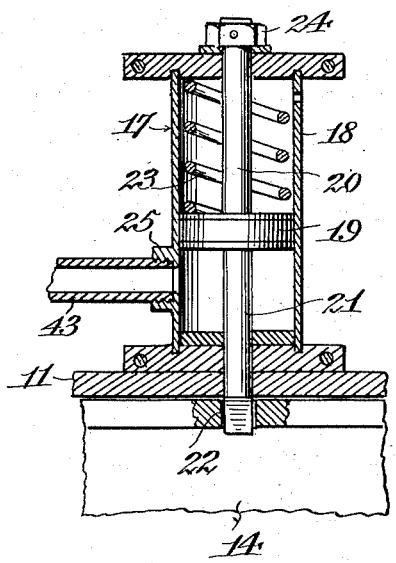
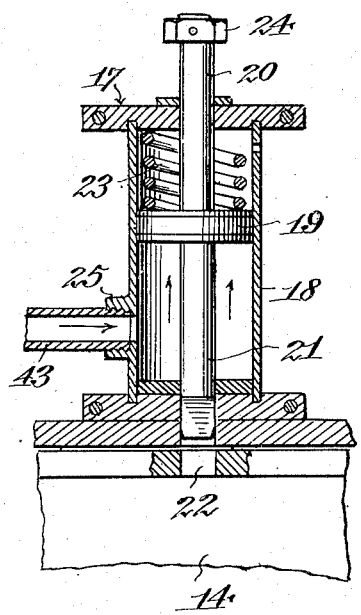
INVENTOR
Vernon A. Taylor
BY
Munn, Liddy & Glaccum
ATTORNEYS Patented Sept. 19, 1950

2,522,849

UNITED STATES PATENT OFFICE 2,522,849

AIRCRAFT EMERGENCY EXIT SYSTEM

Vernon A. Taylor, Corona, N. Y.

Application May 6, 1948, Serial No. 25,335

5 Claims. (Cl. 244—129)

This invention relates to an exit system or arrangement which may be used advantageously in conjunction with an aircraft for the egress of passengers and others in an emergency.

An object of the present invention is the provision of a system or arrangement of the indicated character, in which doors or hatches, normally latched closed, are under the control of the pilot of the aircraft and are automatically forced open when released or unlatched by the pilot.

A further object of the invention is the provision of a safety system or arrangement as characterized above in which the latches are spring loader or actuated to hold the doors or hatches closed, and which latches are pneumatically operable to unlatch the doors or hatches for movement to open position.

A further object of the invention is the provision of a safety system or arrangement of the indicated character which may be set so that while the aircraft is airborne, or has safely landed, the doors or hatches cannot be unintentionally or accidentally opened, and which requires special duty of a designated person to set the system prior to making a landing so that the doors or hatches may be quickly opened in a subsequent emergency.

With the foregoing, other objects and benefits of the invention will appear when the following specification is read in conjunction with the accompanying drawings in which Fig. 1 is a side view of a passenger airplane selected to illustrate the emergency exit system of the present invention shown applied thereto Fig. 1a is an enlarged fragmentary side view showing one of the doors or hatches.

Fig. 2 is an enlarged transverse sectional view taken on the line 2—2 of Fig. 1.

Fig. 3 is a diagrammatic view showing certain features of the system.

Fig. 4 is an enlarged sectional view taken on the line 4—4 of Fig. 3.

Fig. 5 is an enlarged sectional view of the control valve taken on the line 5—5 of Fig. 4.

Fig. 6 is a vertical sectional view of one of the latches shown latching a door, the greater portion of which is broken away.

Fig. 7 is a view similar to Fig. 6, but showing the door unlatched for opening movement.

Shown in the drawings is an aircraft 10, the fuselage or body 11 of which provides a passenger compartment, enclosure or cabin 12, and a compartment or enclosure 13 for the pilot and other members of the crew.

The emergency exit system of the present invention is incorporated in the aforesaid aircraft 10 as hereinafter described by way of example.

One or a plurality of doors or hatches is connected with one or both sides of the body 11 to afford egress of passengers and others from the compartment, enclosure or cabin 12. In the present instance two doors 14 are shown at one side of the body for the stated purpose. Each door 14 has its lower edge portion hingedly connected with the body 11, as at 15, for outward movement from a normally closed position in the door opening into an open position. The door may be inclined or hang vertically in its open position. Each door is forcefully moved into its open position by suitable means, such as coiled springs 16, each surrounding the hinge pintle with one end bearing on the body and its other end bearing on the door.

A pneumatically operable latch 17 is employed to cooperate with each door. The latch 17 comprises a cylinder 18, a piston 19 operable in the cylinder, said piston having a rod 20 projecting through the upper head of the cylinder and also having a latch member 21 projecting downwardly out of the cylinder 18. The cylinder is fixedly secured to the door jamb on the body 11 so that the latch member 21 may engage in a keeper 22 in the upper edge portion of the door to hold the door in its closed position against the stress of the springs 16. A helical compression 23 is arrangeed in the cylinder 18 surrounding the rod 20 and bears on the piston 19 and the removable head of the cylinder so as to yieldingly retain the latch member in a latching position with respect to the door. The outer end of the rod 20 has a nut 24 or the like which engages a washer on the head of the cylinder 18, thereby limiting the downward movement of the piston 19 to a position above the air inlet 25 of the cylinder.

A tank 26 containing a supply of compressed air is arranged within the body 11 at any suitable location therein. The tank 26 has a puncturable seal 27 on one end. The seal may be made of lead or any other suitable material. Air release means which is operable to puncture the seal 27 is connected with the tank 26. Said means includes a casing 28 in airtight connection with the neck of the tank. A puncturing element 29 is mounted for axial movement in a hole in a partition of the casing. The root end of the element 29 is beveled. A spirally grooved drum or disk 30 is mounted for rotation within the casing 28. The disk has a cam 31 which acts on the element 29 in the rotation of the disk causing said element to puncture the seal 27. Return rotation of the disk is caused by a helical tension spring 32 whose opposite ends are connected with the disk and the casing respectively. The casing has an air outlet 33. Use is made of a two-way control valve 34 comprising a circular casing 35 and a circular valve member 36 turnable in the casing 35. This casing has an inlet 37 and outlets 38 and 39 opening therethrough. The valve member 36 has an L shape passage 40 therein which is registrable with the inlet 37 and either one of the outlets 38 and 39. A knob 41 on the valve member 36 and projecting through the casing 35 may be manipulated to set the valve member as aforesaid. The valve 34 is arranged within the compartment 13.

A feed pipe 42 has one end connected with the outlet 33 and its other end is connected with the inlet 37. A branched distributor pipe 43 is connected with the outlet 38 and its branches are connected with the respective inlets 25 of the latch cylinders 18. A bleeder pipe 44 is connected with the outlet 39 and projects upwardly through the compartment 13 into the atmosphere, as shown in Fig. 2.

Means under the control of the pilot of the aircraft for operating the air release means consists of a cable or the like 45 which has one end secured to the disk 30 and its other end has a handle 46 secured thereto adjacent the pilot's seat. The cable 45 is trained over pulleys 47 arranged at different points on the walls of the body 11 and extends through a guide 48 on the casing 28.

From the foregoing it will be understood there is described an emergency exit system which may be operated from the flight compartment by the captain or co-pilot. Prior to any flight the pilot, or an appointed crew member as a matter of duty, checks the amount of compressed air in the tank 26. Before take-off, the member 36 of the control valve 34 is set in the "on" position to establish communication between the feed pipe 42 and the distributor pipe 43. After the craft is airborne, the pilot resets the valve member 36 in its "off" position to establish communication between the feed pipe 42 and the bleeder pipe 44. Before landing the valve member is again set in the "on" position.

When the valve member 36 is in its "on" position the system is ready to enable the pilot to cause the instant opening of the doors 14 for the egress of passengers and others in an emergency, such as a crash landing. The pilot by pulling on the handle 46 causes rotation of the disk 30, which in turn, by virtue of the cam 31 and element 29 cause the seal 27 to be punctured, releasing the air from the tank 26. The air under pressure flows from the tank through the casing 28, pipe 42, passage 40, pipe 43, and inlets 25 into the cylinders 18. This causes pistons 19 to move upwardly against the stress of the springs 23, thereby withdrawing the latch members 21 from the keepers 22, and releasing the doors 14 to the action of the springs 16 which force the doors into open position for the stated purpose.

When the valve member 36 is in the "off" position, the doors cannot be opened while the craft is airborne, as a safety precaution. Inadvertent release of the air while the valve member 36 is in the "off" position will cause the air to flow through the casing 28, pipe 42, passage 40, and pipe 44 to the atmosphere. It is desired to bleed the system in the event the air is accidently or inadvertently released so that the doors cannot be opened while the craft is airborne. This precaution is taken against the possibility of a leaky control valve which though closed might allow air to flow to the latches upon inadvertent release of the air from the supply tank.

I claim:

1. The combination with an aircraft having a cabin, of a self-opening emergency exit door for the cabin, fluid pressure operated latch means which releasably holds said door closed, a manually operable fluid control valve comprising a casing having an inlet and an outlet, and a valve member rotatable in said casing having a passage therein which establishes communication between the inlet and outlet in the "on" position of the valve member, and which disestablishes communication between the inlet and outlet in the "off" position of the valve member, a tank containing fluid under pressure, manually operable means for releasing the fluid from the tank and having a casing connected with the tank adapted to receive the released fluid, said last casing having an outlet, a pipe connected with said casings establishing communication between the inlet of the valve casing and the outlet of the casing of the fluid release means, conduit means connected with the valve casing and the latch means for conveying fluid to the latter from the outlet of the valve casing, the provision and arrangement being such that when the valve member is in the "on" position and the fluid releasing means is operated, the latch means will be operated thereby releasing the door so that the door will open.

2. The combination as set forth in claim 1, wherein the aircraft has a pilot's compartment, and the fluid releasing means has a manipulator, the control valve and the manipulator being arranged within said compartment.

3. The combination with an aircraft having a passenger compartment and a pilot's compartment, of an emergency exit system comprising an exit door hingedly connected with the passenger compartment for outward movement to an open position, a pneumatically operable latch on the compartment which normally holds the door closed, means for forcing the door open when unlatched, a tank of compressed air within the aircraft, said tank having an air release means, a feed pipe leading from the release means to said latch and extending into the pilot's compartment, a manually operable air control valve in said feed pipe within the pilot's compartment, said valve being manually operable for allowing air to flow or stop its flow through the feed pipe from the release means, and manually operable means extending into the pilot's compartment and connected with the release means for operating the latter, the provision and arrangement being such that when the control valve allows the flow of air as aforesaid and the release means is operated, the latch will be operated, thereby unlatching the door so that it will be forced open.

4. The combination as set forth in claim 3, wherein the control valve is of a two-way type, and an air bleeder pipe connected with the control valve so that the control valve may be set to establish communication between the feed pipe and the bleeder pipe which will bleed the air from the system upon inadvertent opening of the air release means.

5. An emergency exit system comprising the combination of a hingedly connected exit door movable outwardly to an open position, a pneumatically operable latch which normally holds the door closed, means for forcing the door open when unlatched, a tank of compressed air, said tank having an air release means, a feed pipe leading from the release means to the latch, a manually operable control valve in said feed pipe, said valve being manually operable for allowing air to flow or stop its flow through the feed pipe from the release means, and manually operable means connected with the release means for operating the latter, the provision and arrangement being such that when the control valve allows the flow of air as aforesaid and the release means is operated, the latch will be operated, thereby unlatching the door so that it will be forced open.

VERNON A. TAYLOR.

REFERENCES CITED

The following references are of record in the file of this patent:

UNITED STATES PATENTS

| Number | Name | Date |
|---|---|---|
| 1,804,156 | Drbul | May 5, 1931 |
| 1,818,597 | Adams et al. | Aug. 11, 1931 |
| 2,198,862 | Chesler | Apr. 30, 1940 |
| 2,346,977 | La Sha | Apr. 18, 1944 |
| 2,455,157 | Bigelow | Nov. 30, 1948 |

FOREIGN PATENTS

| Number | Country | Date |
|---|---|---|
| 364,030 | Great Britain | Dec. 28, 1931 |

OTHER REFERENCES

Publication: Beechcraft JRB-2 Naval Transport Aircraft; p. 144c of Janes' "All The World's Aircraft," for 1942.